(12) United States Patent
Xia et al.

(10) Patent No.: US 11,477,824 B2
(45) Date of Patent: Oct. 18, 2022

(54) SYSTEM AND METHOD FOR REQUEST MULTIPLEXING

(71) Applicant: Futurewei Technologies, Inc., Plano, TX (US)

(72) Inventors: Pengfei Xia, San Diego, CA (US); Young Hoon Kwon, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 827 days.

(21) Appl. No.: 15/970,426

(22) Filed: May 3, 2018

(65) Prior Publication Data

US 2019/0075599 A1 Mar. 7, 2019

Related U.S. Application Data

(60) Provisional application No. 62/555,472, filed on Sep. 7, 2017.

(51) Int. Cl.
*H04W 40/22* (2009.01)
*H04W 76/14* (2018.01)
(Continued)

(52) U.S. Cl.
CPC ...... *H04W 74/0833* (2013.01); *H04B 7/0617* (2013.01); *H04B 7/0626* (2013.01);
(Continued)

(58) Field of Classification Search
CPC ........... H04W 74/0833; H04W 52/146; H04W 52/48; H04W 52/325; H04B 7/088;
(Continued)

(56) References Cited

U.S. PATENT DOCUMENTS

2010/0103044 A1 4/2010 Hoshino et al.
2016/0157267 A1* 6/2016 Frenne ................ H04W 72/046
370/329
(Continued)

FOREIGN PATENT DOCUMENTS

WO 2014139174 A1 9/2014
WO 2016210302 A1 12/2016

OTHER PUBLICATIONS

Samsung, "4-step RACH procedure discussion", 3GPP TSG RAN WG1 Meeting NR AH #2, R1-1710636, Jun. 27-30, 2017, 13 pages, Qingdao, China.
(Continued)

*Primary Examiner* — Habte Mered
(74) *Attorney, Agent, or Firm* — Slater Matsil, LLP

(57) ABSTRACT

A method for operating a user equipment (UE) includes detecting that a first request type of a first request is not a beam failure recovery request (BFRQ) and based thereon, selecting a first random access resource for transmitting the first request, wherein the first random access resource is selected from a first subset of one or more random access resources, and wherein random access resources in the first subset are associated with a communications beam serving the UE, and transmitting, by the UE to an access node, the first request in the first random access resource.

10 Claims, 10 Drawing Sheets

(51) Int. Cl.

| | | |
|---|---|---|
| *H04L 27/26* | (2006.01) | |
| *H04W 40/12* | (2009.01) | |
| *H04W 48/20* | (2009.01) | |
| *H04L 5/00* | (2006.01) | |
| *H04L 27/36* | (2006.01) | |
| *H04W 40/24* | (2009.01) | |
| *H04W 88/04* | (2009.01) | |
| *H04W 8/00* | (2009.01) | |
| *H04W 74/08* | (2009.01) | |
| *H04B 7/06* | (2006.01) | |
| *H04B 17/336* | (2015.01) | |
| *H04B 7/08* | (2006.01) | |
| *H04W 52/14* | (2009.01) | |
| *H04W 52/48* | (2009.01) | |
| *H04W 52/32* | (2009.01) | |

(52) U.S. Cl.
CPC .......... *H04B 7/0695* (2013.01); *H04B 7/088* (2013.01); *H04B 17/336* (2015.01); *H04W 52/146* (2013.01); *H04W 52/325* (2013.01); *H04W 52/48* (2013.01)

(58) Field of Classification Search
CPC .. H04B 7/0695; H04B 7/0617; H04B 7/0626; H04B 17/336
See application file for complete search history.

(56) References Cited

U.S. PATENT DOCUMENTS

| | | | |
|---|---|---|---|
| 2016/0192401 A1 | 6/2016 | Park et al. | |
| 2018/0279136 A1* | 9/2018 | Tsai | H04W 72/046 |
| 2018/0279186 A1* | 9/2018 | Park | H04W 36/30 |
| 2018/0279378 A1* | 9/2018 | Tsai | H04W 56/0005 |
| 2018/0332520 A1* | 11/2018 | Cheng | H04W 36/0016 |
| 2018/0368126 A1* | 12/2018 | Islam | H04L 5/0048 |
| 2019/0053271 A1* | 2/2019 | Islam | H04W 74/0866 |
| 2019/0058517 A1* | 2/2019 | Kang | H04L 5/0048 |
| 2019/0349830 A1* | 11/2019 | Peisa | H04W 36/08 |
| 2019/0387440 A1* | 12/2019 | Yiu | H04W 36/0072 |
| 2020/0015273 A1* | 1/2020 | Zhang | H04L 5/0051 |
| 2020/0245198 A1* | 7/2020 | Nagaraja | H04W 36/0077 |
| 2020/0252266 A1* | 8/2020 | Akoum | H04W 56/001 |
| 2020/0267770 A1* | 8/2020 | Islam | H04W 36/08 |
| 2021/0112466 A1* | 4/2021 | Susitaival | H04W 36/00837 |

OTHER PUBLICATIONS

Nokia et al., "NR Physical Random Access Channel Capacity", 3GPP TSG RAN WG1 NR Ad-Hoc #2, R1-1710890, Jun. 27-30, 2017, 16 Pages, Qingdao, China.

3GPP RAN1 Chairman's Notes RAN1 90, 3GPP TSG RAN WG1 Meeting #90, Prague, Czech Republic, Aug. 21-25, 2017.

Li et al., "Enhanced Analog Beamforming for Single Carrier Millimeter Wave MIMO Systems", IEEE Transactions on Wireless Communications, vol. 16 No 7, Jul. 2017, 14 pages.

Xia et al., "Robust Analog Precoding Designs for Millimeter Wave MIMO Transceivers with Frequency and Time Division Duplexing", IEEE Transactions on Communications, vol. 64, No. 11, Nov. 2016, 13 pages.

Xiao et al., "Enabling UAV Cellular with Millimeter-Wave Communication: Potentials and Approaches", IEEE Communications Magazine, Feb. 11, 2016, 17 pages.

Xiao et al., "Full-Duplex for Millimeter-Wave Communication", IEEE Wireless Communications, Dec. 2017, 8 pages.

Xiao et al., "Codebook Design for Millimeter-Wave Channel Estimation with Hybrid Precoding Structure", IEEE Transactions on Wireless Communications, Mar. 8, 2016, 14 pages.

Interdigital, Inc., "On Remaining Details of Beam Failure Recovery", 3GPP TSG RAN WG1 Meeting #90, R1-1714142, Aug. 21-25, 2017, 6 Pages, Prague, P.R. Czech.

* cited by examiner

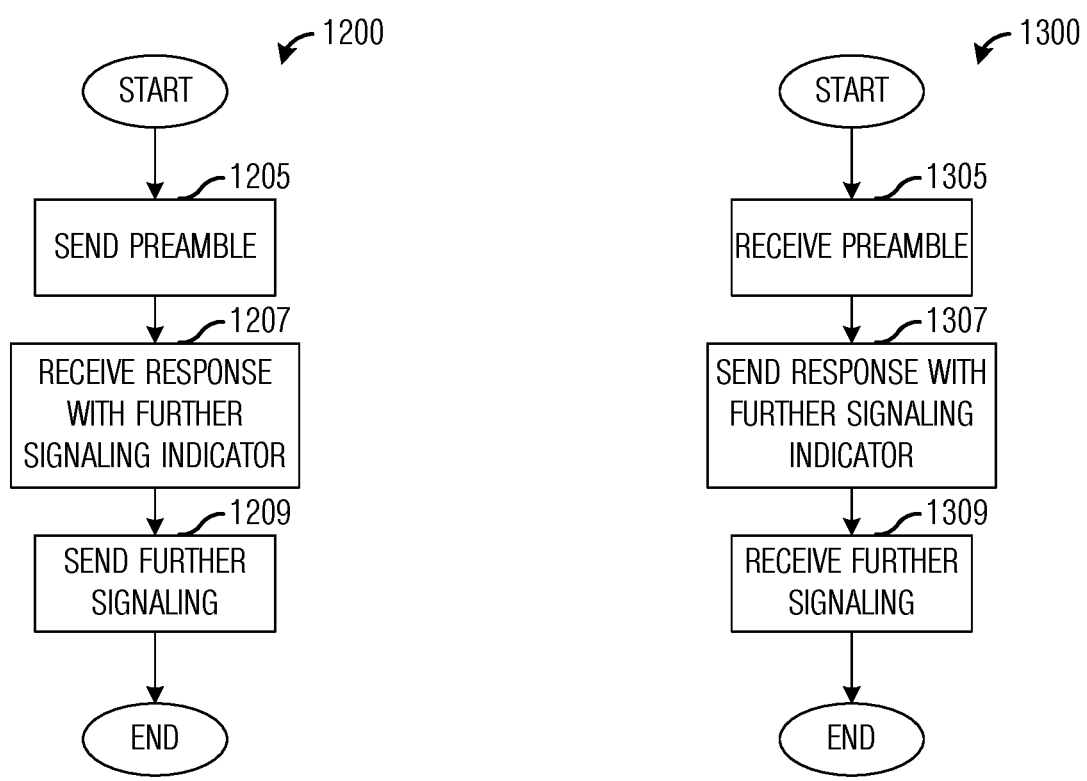

SYSTEM AND METHOD FOR REQUEST MULTIPLEXING

This application claims the benefit of U.S. Provisional Application No. 62/555,472, filed on Sep. 7, 2017, entitled "System and Method for Request Multiplexing," which application is hereby incorporated herein by reference in its entirety.

TECHNICAL FIELD

The present disclosure relates generally to a system and method for digital communications, and, in particular embodiments, to a system and method for request multiplexing.

BACKGROUND

In modern communications systems, such as those that are Third Generation Partnership Project (3GPP) Long Term Evolution (LTE) compliant, requests are sent by a first device to a second device to initiate a service or process. As an example, a user equipment (UE) may send a scheduling request to an access node to request that the access node allocate one or more network resources to the UE to allow the UE to make a transmission.

There are many different types of requests and in many implementations, each of the different requests is communicated over resources solely dedicated to the particular request. Thereby leading to the inefficient use of valuable network resources. Therefore, there is a need for systems and methods that improve the efficiency associated with the communicating of requests.

SUMMARY

Example embodiments provide a system and method for request multiplexing.

In accordance with an example embodiment, a computer implemented method for operating a user equipment (UE) is provided. The method includes detecting, by the UE, that a first request type of a first request is not a beam failure recovery request (BFRQ) and based thereon, selecting, by the UE, a first random access resource for transmitting the first request, wherein the first random access resource is selected from a first subset of one or more random access resources, and wherein random access resources in the first subset are associated with a communications beam serving the UE, and transmitting, by the UE to an access node, the first request in the first random access resource.

Optionally, in any of the preceding embodiments, further including detecting, by the UE, that a second request type of a second request is a BFRQ, and based thereon, selecting, by the UE, a second random access resource for transmitting the second request, wherein the second random access resource is selected from a second subset of the one or more random access resources, and wherein random access resources in the second subset are unassociated with the communications beam serving the UE, and transmitting, by the UE to the access node, the second request in the second random access resource.

Optionally, in any of the preceding embodiments, wherein the first subset and the second subset are mutually exclusive.

Optionally, in any of the preceding embodiments, wherein the first request is a scheduling request type, a handover request type, a beam management request type, a beam refinement request type, a beam tracking request type, or a power control request type.

In accordance with an example embodiment, a computer implemented method for operating an access node is provided. The method includes receiving, by the access node from a UE, a first request on a first random access resource, and determining, by the access node, that the first random access resource is a member of a first subset of one or more random access resources in accordance with an association between the first random access resource and a communications beam serving the UE, and based thereon, determining, by the access node, that a request type of the first request is not a BFRQ.

Optionally, in any of the preceding embodiments, further including receiving, by the access node from the UE, a second request on a second random access resource, and determining, by the access node, that the second random access resource is a member of a second subset of the one or more random access resources in accordance with an association between the second random access resource and the communications beam serving the UE, and based thereon, determining, by the access node, that a request type of the second request is a BFRQ.

Optionally, in any of the preceding embodiments, wherein the first subset and the second subset are mutually exclusive.

Optionally, in any of the preceding embodiments, wherein the second random access resource is unassociated with the communications beam serving the UE.

Optionally, in any of the preceding embodiments, wherein the first random access resource is associated with the communications beam serving the UE.

Optionally, in any of the preceding embodiments, wherein the first request is a scheduling request type, a handover request type, a beam management request type, a beam refinement request type, a beam tracking request type, or a power control request type.

Optionally, in any of the preceding embodiments, further comprising sending, by the access node to the UE, a response responsive to the first request and the request type of the first request.

In accordance with an example embodiment, a UE is provided. The UE includes a memory storage comprising instructions, and one or more processors in communication with the memory storage. The one or more processors execute the instructions to detect that a first request type of a first request is not a BFRQ, and based thereon, select a first random access resource for transmitting the first request, wherein the first random access resource is selected from a first subset of one or more random access resources, and wherein random access resources in the first subset are associated with a communications beam serving the UE, and transmit, to an access node, the first request in the first random access resource.

Optionally, in any of the preceding embodiments, wherein the one or more processors further execute the instructions to detect that a second request type of a second request is a BFRQ, and based thereon, select a second random access resource for transmitting the second request, wherein the second random access resource is selected from a second subset of the one or more random access resources, and wherein random access resources in the second subset are unassociated with the communications beam serving the UE, and transmit, to the access node, the second request in the second random access resource.

Optionally, in any of the preceding embodiments, wherein the first subset and the second subset are mutually exclusive.

Optionally, in any of the preceding embodiments, wherein the first request is a scheduling request type, a handover request type, a beam management request type, a beam refinement request type, a beam tracking request type, or a power control request type.

In accordance with an example embodiment, an access node is provided. The access node includes a memory storage comprising instructions, and one or more processors in communication with the memory storage. The one or more processors execute the instructions to receive, from a UE, a first request on a first random access resource, and determine that the first random access resource is a member of a first subset of one or more random access resources in accordance with an association between the first random access resource and a communications beam serving the UE, and based thereon, determine that a request type of the first request is not a BFRQ.

Optionally, in any of the preceding embodiments, wherein the one or more processors further execute the instructions to receive, from the UE, a second request on a second random access resource, and determine that the second random access resource is a member of a second subset of the one or more random access resources in accordance with an association between the second random access resource and the communications beam serving the UE, and based thereon, determine that a request type of the second request is a BFRQ.

Optionally, in any of the preceding embodiments, wherein the second random access resource is unassociated with a communications beam serving the UE.

Optionally, in any of the preceding embodiments, wherein the first random access resource is associated with a communications beam serving the UE.

Optionally, in any of the preceding embodiments, wherein the one or more processors further execute the instructions to send, to the UE, a response responsive to the first request and the request type of the first request.

Practice of the foregoing embodiments enables the multiplexing of beam failure recovery requests with other types of requests to improve communications system performance and overall efficiency.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 12 illustrates a flow diagram of example operations occurring in a UE participating in a random access procedure according to example embodiments described herein; and FIG. 13 illustrates a flow diagram of example operations occurring in an access node participating in a random access procedure according to example embodiments described herein.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
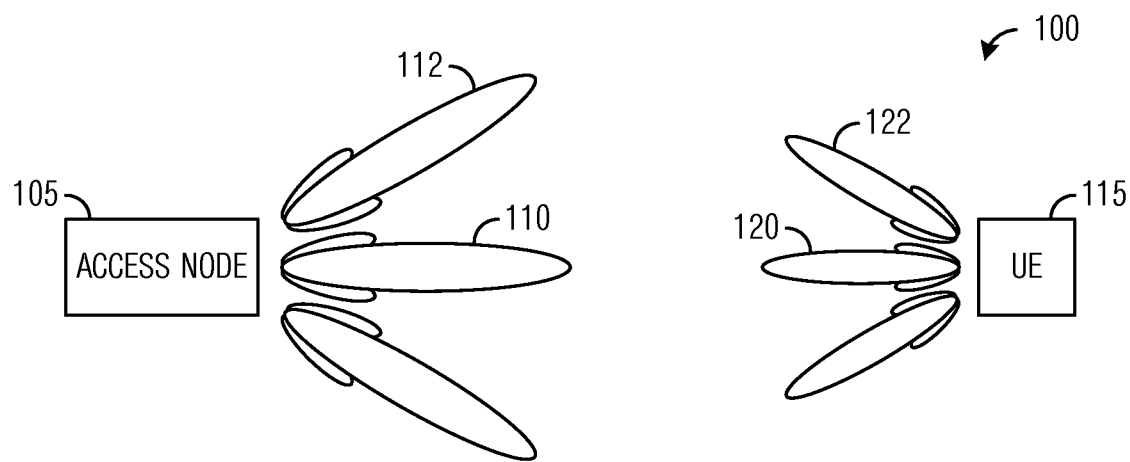
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like.

While it is understood that communications systems may employ multiple access nodes capable of communicating with a number of UEs, only one access node and one UE are illustrated for simplicity.

Pathloss in communications systems operating at high frequency (HF) (6 gigahertz (GHz) and above, such as millimeter wavelength (mmWave)) operating frequencies is high, and beamforming may be used to overcome the high pathloss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

The beams of HF communications systems are fragile due to the high pathloss present at HF. The beams are easily blocked by objects or entities located in or near the path between source and destination. The signal quality of beams that are experiencing blockage is typically significantly lower when compared to the signal quality prior to the occurrence of the blockage (or even beams that are not blocked). When the signal quality drops below a specified threshold, the associated beam(s) may be deemed as having failed. In other words, a beam is deemed as a failed beam when the signal quality associated with the beam drops below the specified threshold. Alternatively, a beam may be deemed as having failed if the decoding of received packets of a particular channel fails for a specified number of packets or for a specified amount of time.

When a beam failure between an access node and a UE is detected, the UE may select one or more replacement beams from a set of candidate beams of the access node detectable by the UE to replace the failed beam. The replacement of the failed beam with the one or more replacement beam occurs during a beam failure recovery procedure performed by the UE and the access node. The beam failure recovery procedure may be initiated by the UE, or alternatively, the access node may initiate the beam failure recovery procedure. A detailed discussion of an example UE initiated beam failure recovery procedure is as follows:

The UE detects a beam failure with all or parts of a channel (such as a physical downlink control channel (PDCCH) or some other control channel) fails, where the channel fails when a quality indicator (such as signal quality (e.g., signal plus interference to noise ratio (SINR), signal to noise ratio (SNR), reference signal received power (RSRP), reference signal received quality (RSRQ), and so on) does not meet a specified threshold, a performance metric (e.g., specified number of successive failed packet decode attempts, count of failed packet decode attempts within time interval exceeds a specified threshold, and so forth), etc.);

The UE detects (or selects) one or more candidate beams and determines its identity, New Identified Beam (NIB). The one or more candidate beams may be detected in accordance with measurements of reference signals, such as beam failure reference signals (BFRS), transmitted by the access node on different beams of the access node. It is noted that the BFRS may include channel state information reference signals (CSI-RS), synchronization signals (SS), a reference signal specifically designed for beam failure recovery, or a combination thereof. The NIB may be a beam index of the BFRS, such as a CSI-RS index (CRI), an SS index (SSI), and so on;

The UE sends a beam failure recovery request (BFRQ) to the access node. The BFRQ may include at least a preamble. The preamble may be UE-specific so that the access node is able to identify the UE in accordance with the received preamble. The preamble may be pre-assigned to the UE by the access node, such as by a radio resource control (RRC) message. The preamble is hereby referred to herein as a beam recovery random access channel (BRACH) preamble and a BRACH resource may be referred to as a random access resource; and The access node analyzes the received preamble to identify the UE, i.e., determine a UE ID. Identifying the UE allows the access node to act accordingly, e.g., send a beam failure recovery response (BFRP) to the UE that sent the BFRQ.

The NIB of the one or more candidate beams may be signaled implicitly by the UE. As an illustrative example, the location of the preamble in the time, frequency, or sequence domain conveys information about the NIB. An example implicit signaling approach takes place over two steps: Step 1 includes the transmission of the preamble by the UE at a location that conveys information about the NIB; and Step 2 includes the access node transmitting a response to the UE. In an embodiment, the response includes a PDCCH or a physical downlink shared channel (PDSCH) message from the access node to the UE. Upon detecting the PDCCH or PDSCH message, UE is able to receive a response and may conclude that the beam failure recovery procedure has completed successfully or unsuccessfully. In another embodiment, the response includes a request from the access node for further signaling. One example of such a request is that the access node may request, within this response message, the UE to further report beam quality information associated with the previous new identified beam index. Another example of such a request is that the access node may request, within this response message, the UE to participate in a downlink or uplink beam management, beam refinement, or beam tracking procedure, while the request itself may include configurations of such a beam management, beam refinement, or beam tracking procedure. Together with this request, the access node may also send a uplink grant to the UE assigning a certain uplink resources to the UE so that UE may use uplink resources to send the requested beam quality report, or to participate in the beam management, beam refinement, or beam tracking procedure (e.g., sending uplink sounding reference signals, sending downlink reference signal measurement results, and so on).

Alternatively, the NIB of the one or more candidate beams may be signaled explicitly by the UE. An example explicit signaling approach takes place over four steps: Step 1 includes the transmission of the preamble by the UE; Step 2 includes the access node assigning an uplink grant to the UE; Step 3 includes the UE explicitly sending the NIB (e.g., a CRI) to the access node in network resources of the uplink grant; and Step 4 includes the access node transmitting a response to the UE. It is noted that a combination of both implicit and explicit signaling of the NIB may be used.

Figure 2:
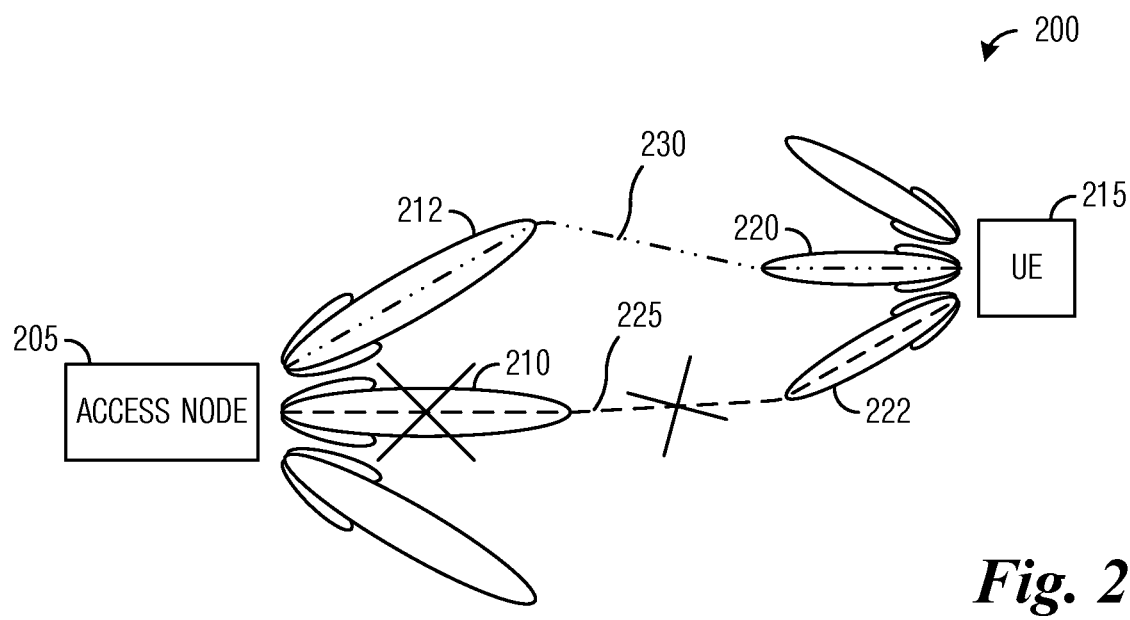
FIG. 2 illustrates an example wireless communications system highlighting beam failure and beam failure recovery according to example embodiments described herein.

FIG. 2 illustrates a wireless communications system 200 highlighting beam failure and beam failure recovery. Communications system 200 includes an access node 205 serving a UE 215. As shown in FIG. 2, both access node 205 and UE 215 communicate using beamformed transmissions and receptions. As an example access node 205 communicates using a plurality of communications beams, including beams 210 and 212, while UE 215 communicates using a plurality of communications beams, including beams 220 and 222.

Initially, access node 205 and UE 215 are communicating through beam pair link (BPL) 225, which comprises beams 210 and 222 as the beam pair. However, due to blockage or UE mobility, BPL 225 fails. As an example, a blockage occurs between access node 205 and UE 215, causing BPL 225 to fail. UE 215 detects a candidate beam 212 from access node 205 to replace failed beam 210, for example. UE 215 initiates beam failure recovery by sending a BFRQ to access node 205. Upon completion of the beam failure recovery, BPL 230 is established (comprising beams 212 and 220 as the beam pair).

The BRACH preamble sent by the UE in the BFRQ is sent in a BRACH resource. BRACH resources may be separated in the time domain, frequency domain, sequence domain, or a combination thereof. Each BRACH resource that can be used to convey a BRACH preamble of a particular UE may be referred to as a possible BRACH resource (PBR) of the UE. As an example, a UE may send a BRACH preamble in PBR time resources 1, 2, and so on. As another example, a UE may send a BRACH preamble in PBR frequency resource 1, 2, and so forth. As yet another example, a UE may send a BRACH preamble in PBR sequence resource 1, 2, etc. As yet another example, a UE may send a BRACH preamble in PBR resource with cyclic shift 1, 2, and so on. In general, a UE has N PBRs with which to send a BRACH preamble. By selecting one out of the N PBRs to actually transmit the BRACH preamble, the UE is able to implicitly convey $Log_2(N)$ bits of information to the access node. The access node is able to detect which BRACH resource that the UE used to transmit the BRACH preamble and is able to infer the $Log_2(N)$ bits of information from the UE. The $Log_2(N)$ bits of information may be used to convey information about the NIB (e.g., the CRI, SSI, or some other beam index).

For discussion purposes, consider a situation where there are N BFRSs (such as SSs, CSI-RSs, etc.) configured as possible new beam indices, together with M PBRs, where N is less than or equal to M. Then, each of the N BFRSs may be associated with one or more PBRs. In general, a reference signal (RS) is associated with a resource if the RS is assigned to be transmitted in the resource. Similarly, a beam is associated with a RS if the RS is assigned to be transmitted on the beam. Conversely, a RS is unassociated or not associated with a resource if the RS is not assigned to be transmitted in the resource, and a beam is unassociated or not associated with the RS if the RS is not assigned to be transmitted on the beam. As an illustrative example, if an access node receives a BRACH preamble in a BRACH resource associated with a first set of PBRs, $PBR_1$ (associated with a first BFRS, $BFRS_1$), the access node may interpret the $BFRS_1$ as the NIB. Similarly, if the access node receives the BRACH preamble in a BRACH resource associated with a second set of PBRs, $PBR_2$ (associated with a second BFRS, $BFRS_2$), the access node may interpret the $BFRS_2$ as the NIB, and so forth.

Furthermore, to simplify discussion, consider a situation where there are N BFRSs and M PBRs, where N is equal to M. Then, if a first UE sends a first BRACH preamble on $PBR_1$, then an access node should treat the first BRACH preamble as a BFRQ from the first UE, and at the same time, because the first BRACH preamble is received in $PBR_1$ (instead of $PBR_2$, $PBR_3$, and so on), the access node may interpret that $BFRS_1$ is the NIB, instead of $BFRS_2$, $BFRS_3$, and so forth. Similarly, if the first UE sends the first BRACH preamble on $PBR_2$, then the access node should treat the first BRACH preamble as a BFRQ from the first UE, and at the same time, because the first BRACH preamble is received in $PBR_2$ (instead of $PBR_1$, $PBR_3$, and so forth), the access node may interpret that $BFRS_2$ is the NIB, instead of $BFRS_1$, $BFRS_3$, and so forth.

It is noted that if a beam associated with a particular BFRS is the serving beam of a UE prior to a beam failure occurring on the beam, the access node should not be expecting to receive a BRACH preamble conveying information about the beam in a BFRQ from the UE. This is because it is not logical for the UE to be able to detect the beam as a candidate beam while experiencing a beam failure with the same beam. Therefore, the serving beam of the UE is an invalid candidate beam. As an example, if $BFRS_3$ is the serving beam of the UE, the access node should not expect to receive a BFRQ in $PBR_3$ (which conveys information about $BFRS_3$ as the NIB) from the UE. In the illustrative example, $BFRS_3$ is an invalid BFRS. Conversely, the other beams of the access node may all potentially be valid candidate beams. These other beams may be referred to as valid beams, and their BFRSs are valid BFRSs.

Similarly, there are valid and invalid PBRs. PBRs that are interpreted by an access node as conveying information about valid beams are referred to as valid PBRs, while PBRs that are interpreted by the access node as conveying information about invalid beams are referred to as invalid PBRs. Valid and invalid PBRs may be considered to be mutually exclusive and are part of a plurality of PBRs available to a UE or access node to send or receive requests or beams.

According to an example embodiment, BFRQs and any other type of request (ATRQ) are multiplexed using valid and invalid PBRs (or conveying information about valid and invalid BFRSs). ATRQs may include scheduling requests (SRQs), handover requests (HRQs), beam refinement requests (BRRQs), beam management requests (BMRQs), power control or adjustment requests (PARQs), and so on. As an illustrative example, a UE multiplexes a BFRQ with an ATRQ so that one preamble is used by the UE to convey information about a BFRQ or an ATRQ in different resources. The access node may then perform preamble analysis to identify the UE, as well as identify if the request is a BFRQ or an ATRQ and take appropriate response.

As an illustrative example, let BFRSn be the BFRS associated with the serving beam of a UE, then BFRSn is associated with an invalid beam, while other possible BFRSs are associated with valid beams. Therefore, PBRn is an invalid PBR and other possible PBRs are valid PBRs. The UE can use any of the valid PBRs to transmit a BFRQ, and while to multiplex requests, e.g., transmit an ATRQ, the UE uses the invalid PBR.

Figure 3A:
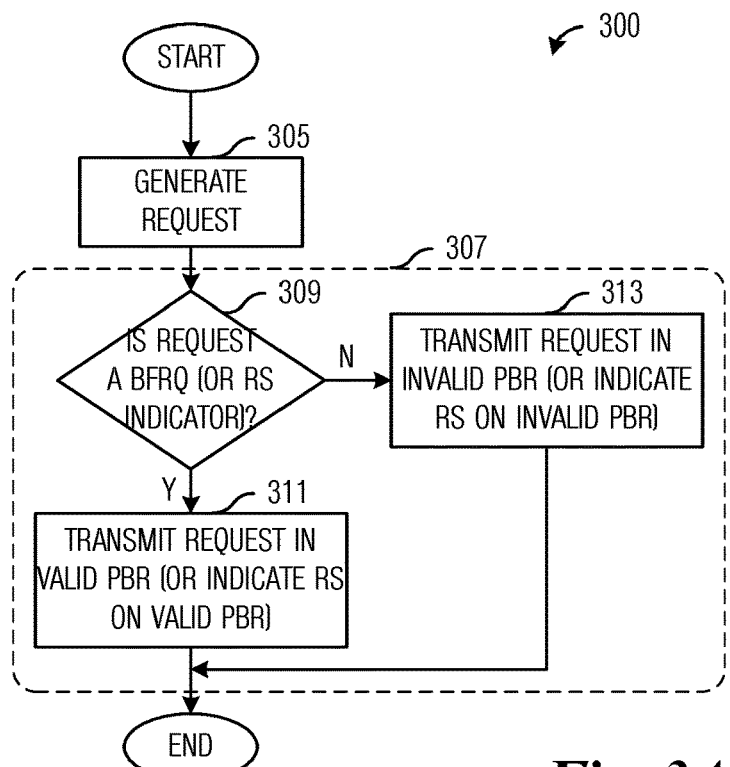
FIG. 3A illustrates a flow diagram of example operations occurring in a UE multiplexing requests according to example embodiments described herein.

FIG. 3A illustrates a flow diagram of example operations 300 occurring in a UE multiplexing requests. Operations 300 may be indicative of operations occurring in a UE as the UE multiplexes requests.

Operations 300 begin with the UE generating a request (block 305). The UE selects a PBR in accordance with a request type of the request (block 307). As an example, the UE performs a check to determine if the request type is a BFRQ (block 309). If the request is a BFRQ, the UE transmits the request in a PBR from a first subset of PBRs (e.g., a valid PBR) (block 311). If the request is not a BFRQ, the UE transmits the request in a PBR from a second subset of PBRs (e.g., an invalid PBR) (block 313). Alternatively, if UE is to convey information about a beam associated with a reference signal, the UE checks in block 309 to determine if the beam associated the reference signal is valid or invalid. If the beam is valid, then the UE conveys information about the beam on the valid PBR (block 311) or else the UE convey information about the beam on the invalid PBR (block 313).

Figure 3B:
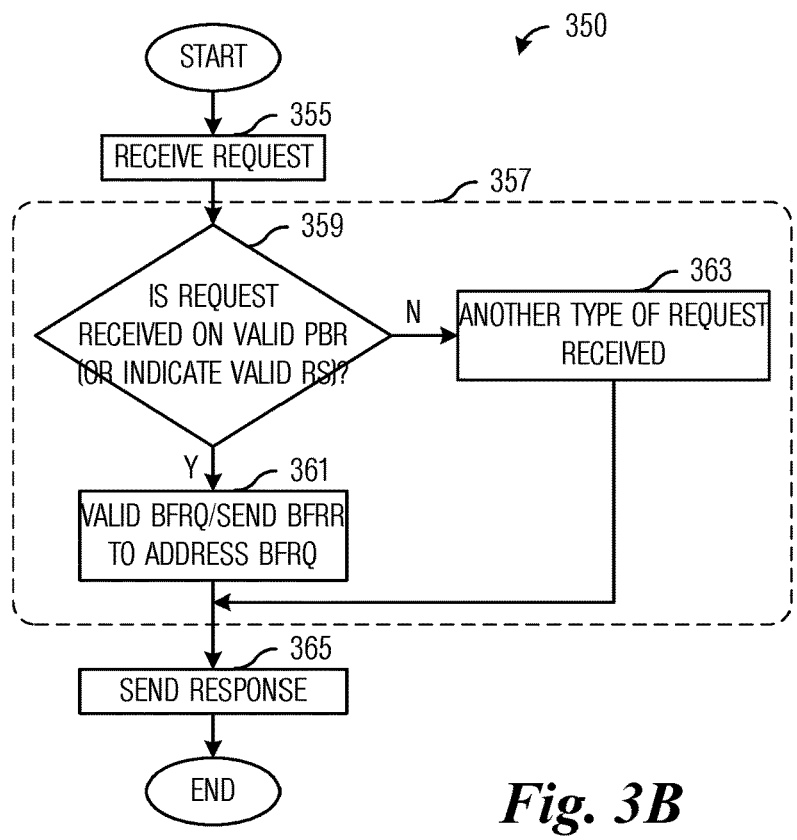
FIG. 3B illustrates a flow diagram of example operations occurring in an access node receiving multiplexed requests according to example embodiments described herein.

FIG. 3B illustrates a flow diagram of example operations 350 occurring in an access node receiving multiplexed requests. Operations 350 may be indicative of operations occurring in an access node as the access node receives multiplexed requests from a UE.

Operations 350 begin with the access node receiving a request (block 355). The access node determines a request type of the request (block 357). As an example, the access node performs a check to determine if the request is received in a valid PBR (block 359). According to an example embodiment, the access node determines the validity of a PBR by identifying the identity of the UE that sent the request and determining valid and invalid PBRs in accordance with the identity of the UE. If the PBR is valid, then the request is a BFRQ (block 361). If the PBR is invalid, then the request is an ATRQ (block 363). The access node sends a response responsive to the request (block 365). As an example, if the request is an ATRQ, the access node sends a response that is responsive to the ATRQ, while if the request is a BFRQ, the access node sends a BFRR to address the BFRQ. Responses responsive to the ATRQ may include a scheduling request response, a handover request response, and so on.

A handover refers to a process wherein a first connection between a UE and a first access node is transferred to a second connection between the UE and a second access node. Handovers typically occur due to UE mobility or changing channel condition. A handover may be initiated by the UE, the first access node, or both the UE and the first access node.

Figure 4:
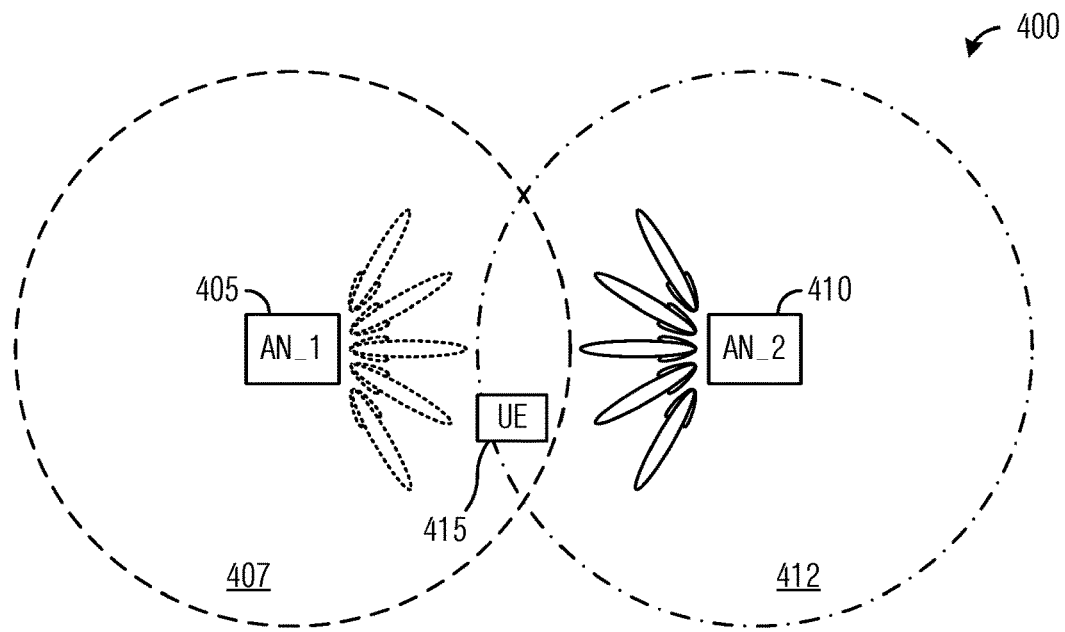
FIG. 4 illustrates a communications system highlighting a handover.

FIG. 4 illustrates a communications system 400 highlighting a handover.

Communications system 400 includes a first access node (AN_1) 405 with a coverage area 407, and a second access node (AN_2) 410 with a coverage area 412. Communications system 400 also includes a UE 415. Initially, UE 415 is served by first access node 405. However, due to UE mobility or changing channel condition, the signal quality of a channel between first access node 405 and UE 415 is decreasing while the signal quality of a channel between second access node 410 and UE 415 is increasing. A handover may be performed by first access node 405, second access node 410, and UE 415 to transfer service for UE 415 from first access node 405 to second access node 410.

Figure 5:
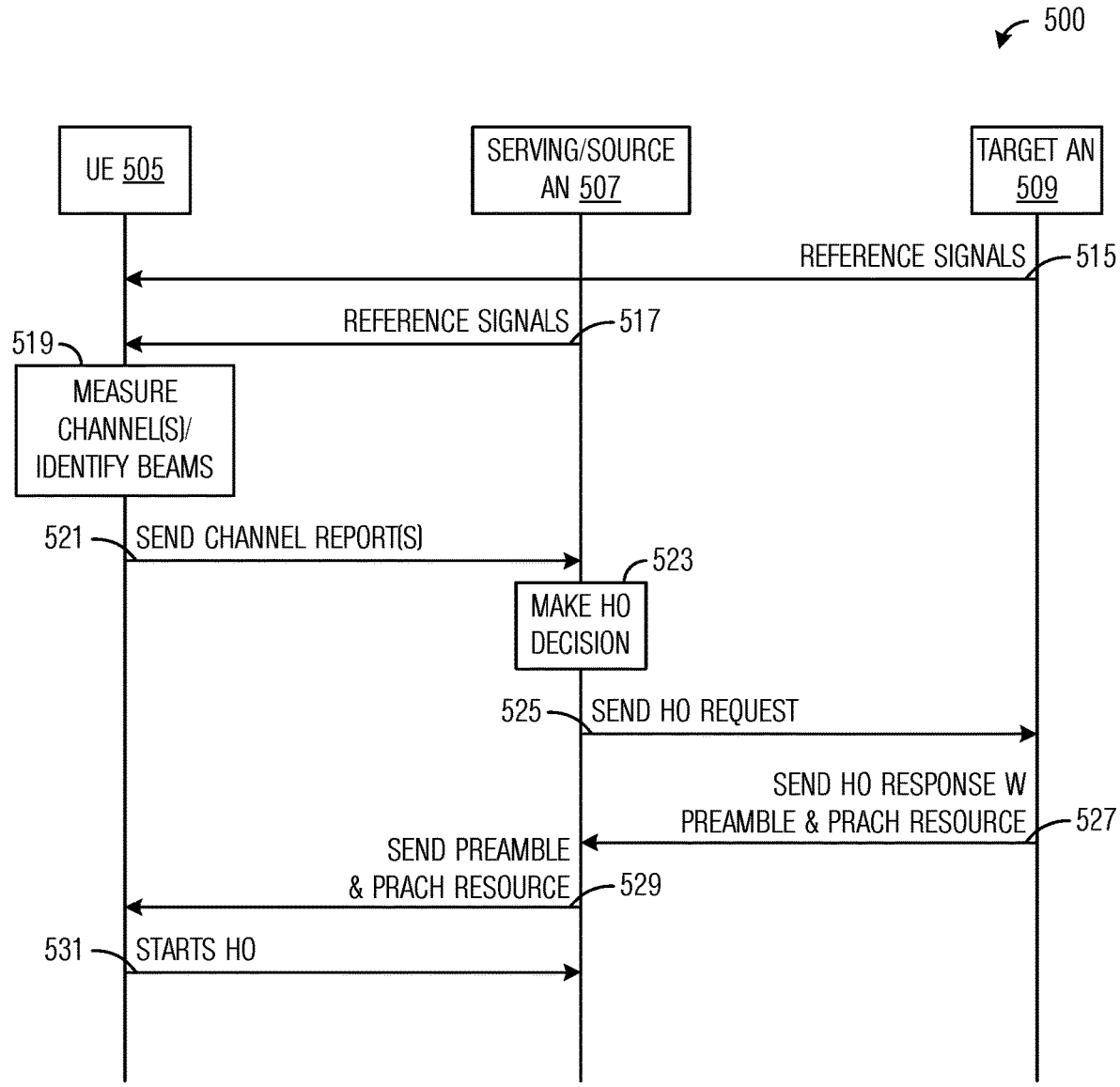
FIG. 5 illustrates a diagram processing occurring in and communications exchanged between devices participating in a handover according to example embodiments described herein.

FIG. 5 illustrates a diagram 500 processing occurring in and communications exchanged between devices participating in a handover. Diagram 500 displays processing occurring in and communications exchanged between a UE 505, a serving or source access node 507, and a target access node 509 as the devices participate in a handover. Serving or source access node 507 is shown in FIG. 5 as serving or source access node 507.

Target access node 509 sends reference signals (such as BFRSs, SSs, CSI-RSs, and so on) (event 515). Serving or source access node 507 sends reference signals (such as BFRSs, SSs, CSI-RSs, and so on) (event 517). UE 505 makes measurements of reference signals transmitted by target access node 509 and serving or source access node 507 (block 519). The measurements made by UE 505 may include SINR, SNR, RSRP or RSRQ of one or more first reference signals (e.g., SSs) transmitted by target access node 509, and SINR, SNR, RSRP or RSRQ of one or more second reference signals (e.g., CSI-RSs) transmitted by target access node 509. In addition to measuring the reference signals sent by serving or source access node 507 and target access node 509, UE 505 identifies the beams associated with the reference signals. It is noted that for each reference signal, UE 505 may identify one or more beams.

UE 505 sends channel reports to serving or source access node 507 (event 521). As an example, UE 505 may send a channel report associated with target access node 509 to serving or source access node 507. The channel report associated with target access node 509 may include one or more indices of beams associated with the one or more first reference signals received from target access node 509 along with measured SINR, SNR, RSRP or RSRQ. The channel report associated with target access node 509 may also include one or more indices of beams associated with the one or more second reference signals received from target access node 509 along with measured SINR, SNR, RSRP or RSRQ. As an example, UE 505 may send a channel report associated with serving or source access node 507 to serving or source access node 507. The channel report associated with serving or source access node 507 may include one or more indices of beams associated with the one or more first reference signals received from serving or source access node 507 along with measured SINR, SNR, RSRP or RSRQ. The channel report associated with serving or source access node 507 may also include one or more indices of beams associated with the one or more second reference signals received from serving or source access node 507 along with measured SINR, SNR, RSRP or RSRQ.

Serving or source access node 507 makes a handover decision (block 523). The handover decision may be made in accordance with the channel reports received from UE 505, for example. For discussion purposes, it is considered that serving or source access node 507 made the decision to handover UE 505 to target access node 509. Serving or source access node 507 sends a handover request to target access node 509 (event 525). The handover request may include one or more indices of beams associated with the one or more first reference signals transmitted by target access node 509 and received by UE 505 along with measured SINR, SNR, RSRP or RSRQ. The number of indices of the one or more first reference signals included in the handover request may be different from the number one or more indices of beams associated with the one or more first reference signals reported by UE 505 in event 521. The handover request may also include one or more indices of beams associated with the one or more second reference signals transmitted by target access node 509 and received by UE 505 along with measured SINR, SNR, RSRP or RSRQ if the second reference signal is configured for interference or mobility measurement purposes. If included, the number of indices of the one or more second reference signals included in the handover request may be different from the number one or more indices of beams associated with the one or more second reference signals reported by UE 505 in event 521. The handover request conveys information about a handover request to target access node 509.

Target access node 509 sends a handover response to serving or source access node 507 (event 527). The handover response may include an assigned non-contention-based preamble for UE 505. The handover response may also include a BRACH resource in time, frequency, or sequence domain assigned to UE 505, where UE 505 is to use the BRACH resource to transmit the preamble for handover purposes. It is noted that in order for UE 505 to send a handover request later, UE 505 needs to send the assigned non-contention-based preamble only at the specified BRACH resource. If the assigned non-contention-based preamble is sent by the UE but not at the specified BRACH resource, then the handover request will be ignored. Serving or source access node 507 may forward the handover response to UE 505 or alternatively, serving or source access node 507 sends the information in the handover response to UE 505 (event 529). UE 505 starts the handover (event 531). UE 505 may start the handover by transmitting the preamble in the BRACH resource (event 531) as specified earlier in the handover response, originally specified by target access node 509, delivered to UE 505 via serving or source access node 507.

Figure 6A:
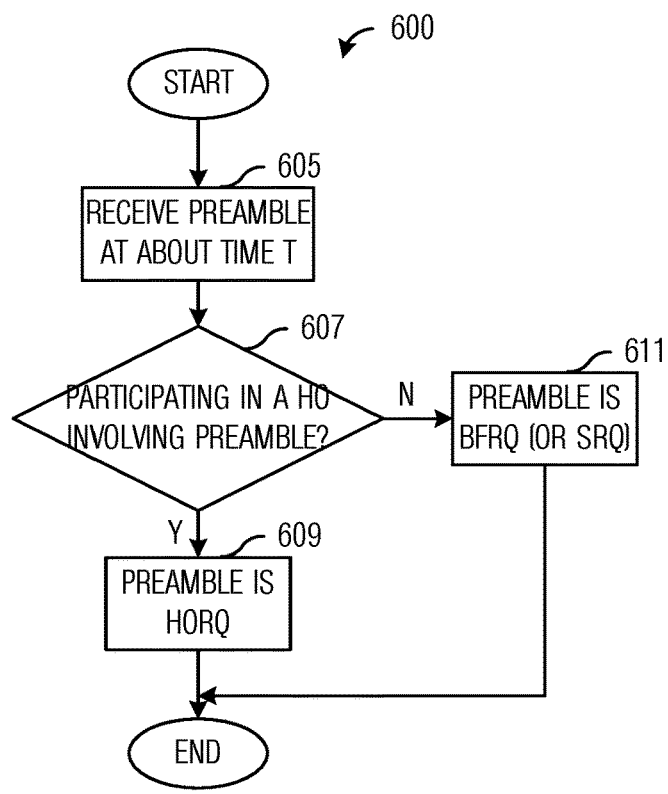
FIG. 6A illustrates a flow diagram of example operations occurring in a target access node receiving and processing a multiplexed request according to example embodiments described herein.

FIG. 6A illustrates a flow diagram of example operations 600 occurring in a target access node receiving and processing a multiplexed request. Operations 600 may be indicative of operations occurring in a target access node as the target access node receives and processes a multiplexed request.

Operations 600 begin with the target access node receiving a preamble at or about time T (block 605). The target access node performs a check to determine if it is participating in a handover involving the preamble (block 607). As an example, the target access node may be participating in a handover involving the preamble if the target access node has recently received a handover request from a serving or source access node regarding a UE for a possible handover with a first time window around the time T. As an example, the target access node may also be participating in a handover involving the preamble if the target access node has allocated the preamble to the UE within a second time window around the time T. As an example, the target access node may also be participating in a handover involving the preamble if the target access node has not yet successfully completed such a handover request. If the target access node is participating in a handover involving the preamble, the target access node treats the preamble is a handover request (block 609). If the target access node is not participating in a handover involving the preamble, the target access node treats the preamble as other types of requests, i.e., an ATRQ (block 611).

Figures 6B, 6C:
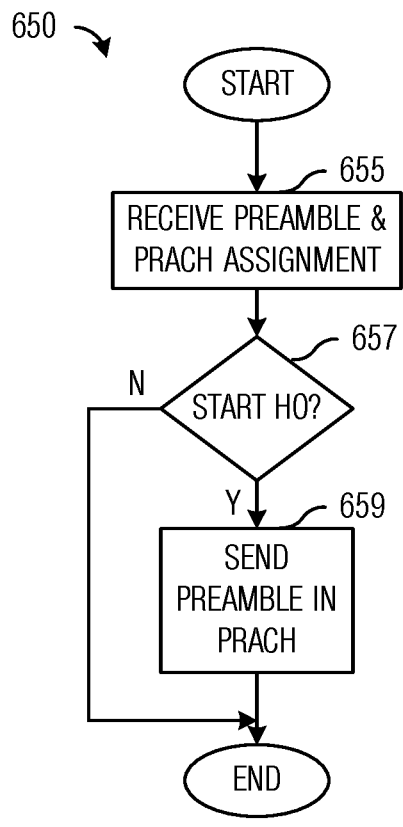
FIG. 6B illustrates a flow diagram of example operations occurring in a UE participating in a handover according to example embodiments described herein.
FIG. 6C illustrates a flow diagram of example operations occurring in a serving or source access node participating in a handover according to example embodiments described herein.

FIG. 6B illustrates a flow diagram of example operations 650 occurring in a UE participating in a handover. Operations 650 may be indicative of operations occurring in a UE as the UE participates in a handover.

Operations 650 begin with the UE receiving a preamble and BRACH resource assignment (block 655). The preamble and the BRACH resource assignment may be made by a target access node and forwarded by a serving or source access node. The UE performs a check to determine if it is to start a handover (block 657). If the UE is to start a handover, the UE sends the assigned preamble in the assigned BRACH resource (block 659). If the UE is not to start a handover, operations 650 end.

FIG. 6C illustrates a flow diagram of example operations 675 occurring in a serving or source access node participating in a handover. Operations 675 may be indicative of operations occurring in a serving or source access node as the serving or source access node participates in a handover.

Operations 675 begin with the serving or source access node receiving channel reports from a UE (block 680). The serving or source access node sends a handover request to a target access node (block 682). The handover request may include a subset of information included in the channel reports. The serving or source access node receives a handover response (block 684). The handover response may include a preamble and a BRACH resource assigned to the UE for handover purposes. The serving or source access node forwards the preamble and BRACH resource assignment to the UE (block 686).

Figure 7:
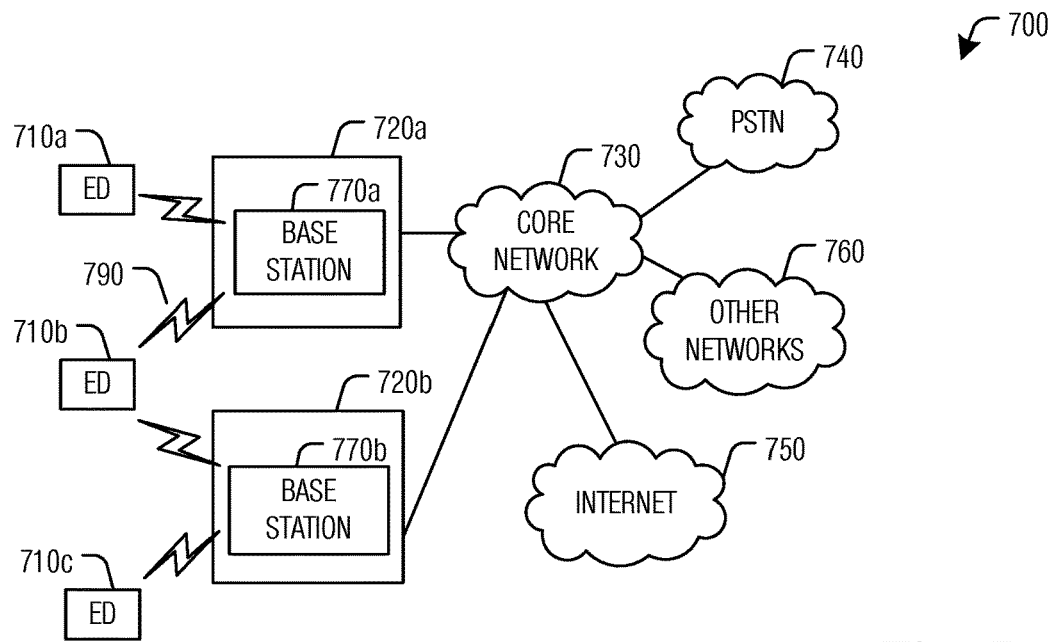
FIG. 7 illustrates an example communication system according to example embodiments described herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 700 includes electronic devices (ED) 710a-710c, radio access networks (RANs) 720a-720b, a core network 730, a public switched telephone network (PSTN) 740, the Internet 750, and other networks 760. While certain numbers of these components or elements are shown in FIG. 7, any number of these components or elements may be included in the system 700.

The EDs 710a-710c are configured to operate or communicate in the system 700. For example, the EDs 710a-710c are configured to transmit or receive via wireless or wired communication channels. Each ED 710a-710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 720a-720b here include base stations 770a-770b, respectively. Each base station 770a-770b is configured to wirelessly interface with one or more of the EDs 710a-710c to enable access to the core network 730, the PSTN 740, the Internet 750, or the other networks 760. For example, the base stations 770a-770b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 710a-710c are configured to interface and communicate with the Internet 750 and may access the core network 730, the PSTN 740, or the other networks 760.

In the embodiment shown in FIG. 7, the base station 770a forms part of the RAN 720a, which may include other base stations, elements, or devices. Also, the base station 770b forms part of the RAN 720b, which may include other base stations, elements, or devices. Each base station 770a-770b operates to transmit or receive wireless signals within a particular geographic region or area, sometimes referred to as a "cell." In some embodiments, multiple-input multiple-output (MIMO) technology may be employed having multiple transceivers for each cell.

The base stations 770a-770b communicate with one or more of the EDs 710a-710c over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement LTE, LTE-A, or LTE-B. Of course, other multiple access schemes and wireless protocols may be utilized.

The RANs 720a-720b are in communication with the core network 730 to provide the EDs 710a-710c with voice, data, application, Voice over Internet Protocol (VoIP), or other services. Understandably, the RANs 720a-720b or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710a-710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
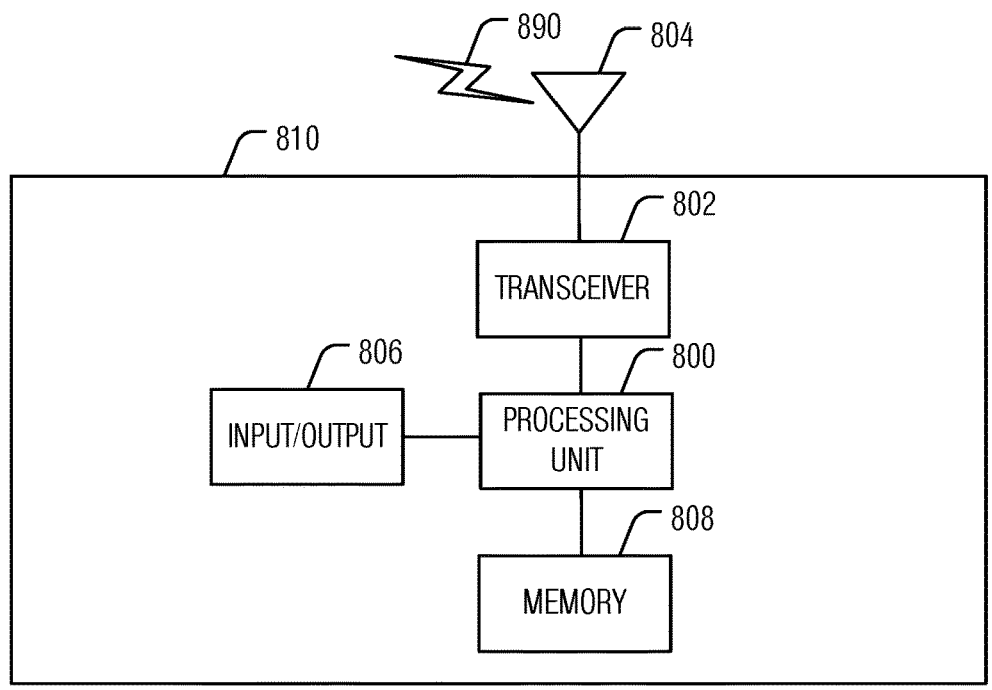
FIGS. 8A and 8B illustrate example devices that may implement the methods and teachings according to this disclosure.
Figure 8B:
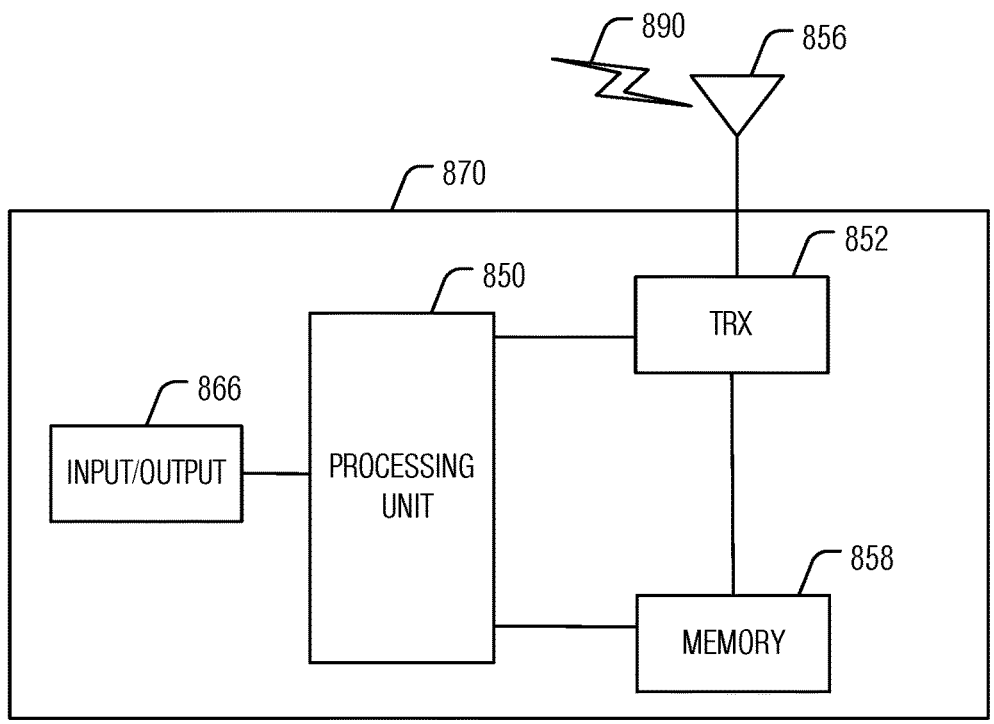

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED Bio includes at least one processing unit 800. The processing unit 800 implements various processing operations of the ED 810. For example, the processing unit 800 could perform signal coding, data processing, power control, input or output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 800 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission or processing signals received wirelessly or by wire. Each antenna 804 includes any suitable structure for transmitting or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input or output devices 806 or interfaces (such as a wired interface to the Internet 750). The input or output devices 806 facilitate interaction with a user or other devices (network communications) in the network. Each input or output device 806 includes any suitable structure for providing information to or receiving or providing information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input or output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input or output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile or non-volatile storage and retrieval device(s). Each input or output device 866 facilitates interaction with a user or other devices (network communications) in the network. Each input or output device 866 includes any suitable structure for providing information to or receiving or providing information from a user, including network interface communications.

Figure 9:
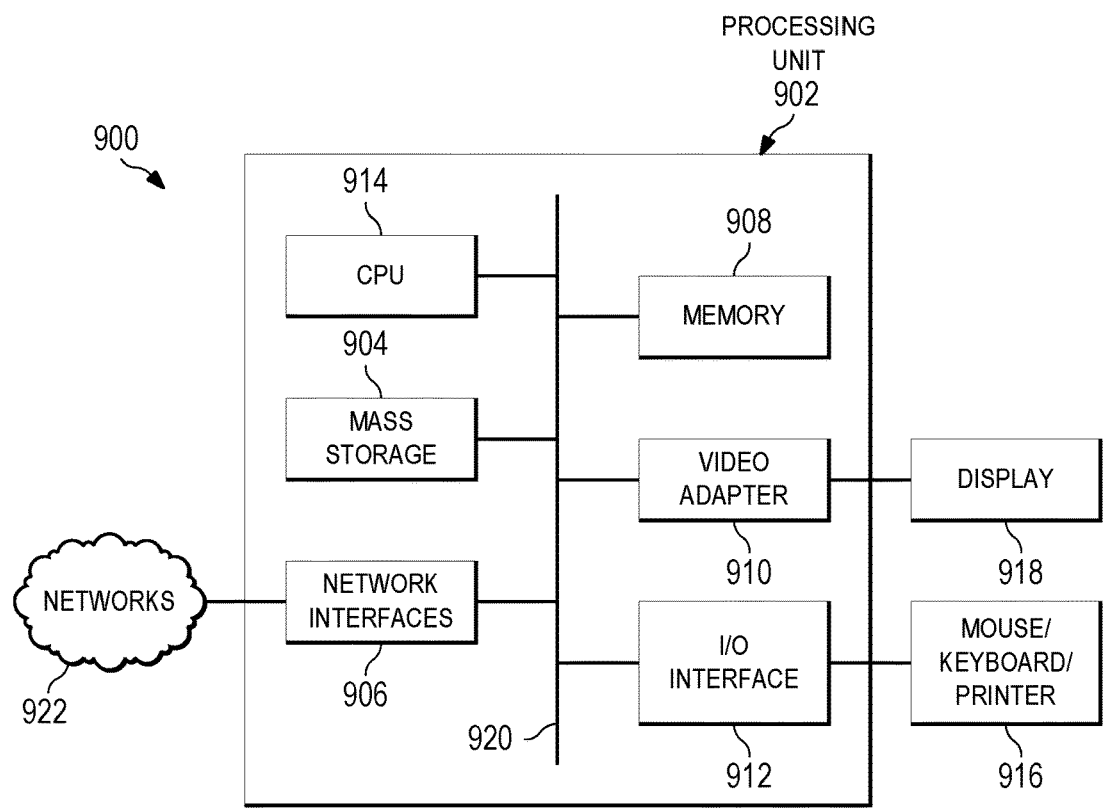
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse, keyboard, or printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, or wireless links to access nodes or different networks. The network interfaces 906 allow the processing unit 902 to communicate with remote units via the networks. For example, the network interfaces 906 may provide wireless communication via one or more transmitters or transmit antennas and one or more receivers or receive antennas. In an embodiment, the processing unit 902 is coupled to a local-area network 922 or a wide-area network for data processing and communications with remote devices, such as other processing units, the Internet, or remote storage facilities.

In the 3GPP TSG RAN $WG_1$ meeting #90, it has been agreed that

"The following options can be configured for new candidate beam identification

CSI-RS only: It is noted that in this case, an SS block (SSB) will not be configured for new candidate beam identification;

SS block only: It is noted that in this case, CSI-RS will not be configured for new candidate beam identification; and For future study: CSI-RS+SS block."

Figure 10:
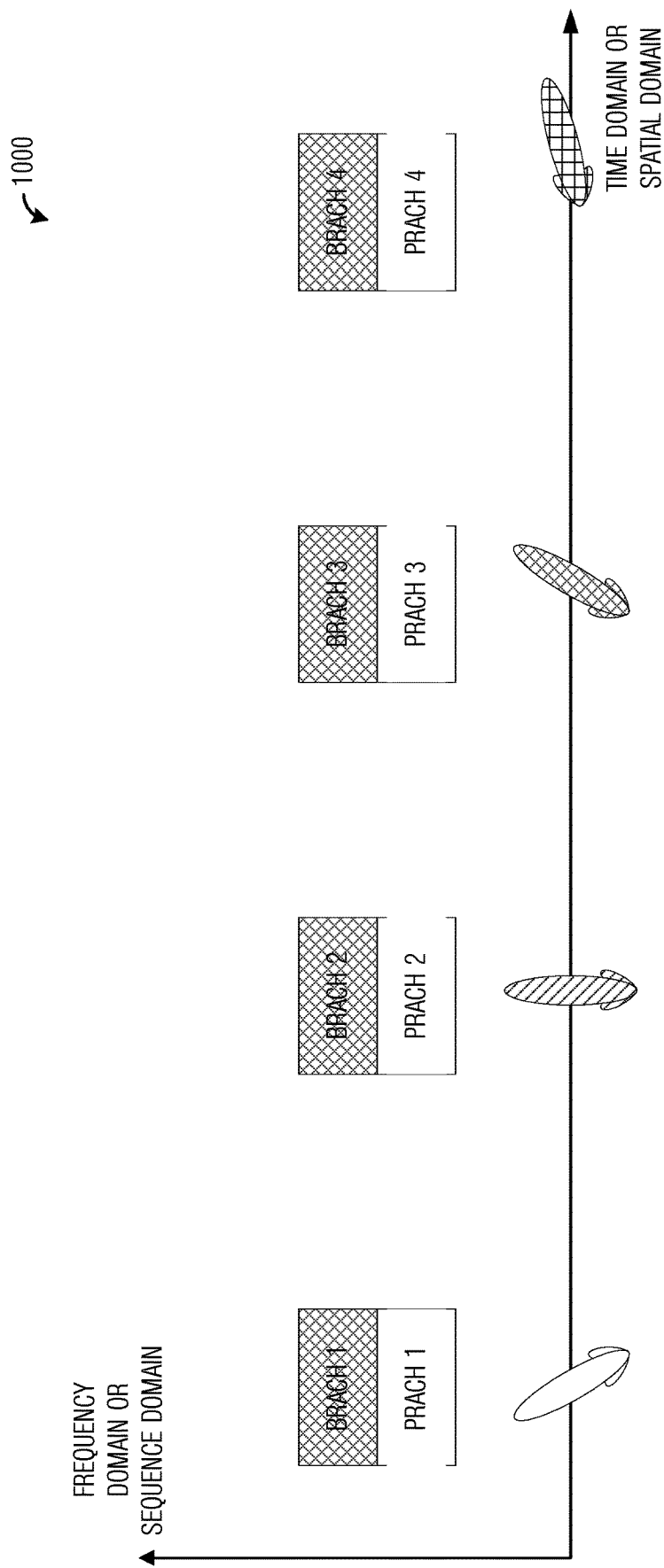
FIG. 10 illustrates a graph of an example of four BRACH opportunities in the time domain, corresponding to four different SS indexes respectively as illustrated in a bottom row of the graph according to example embodiments described herein.

In a situation where a SS block only is configured for new candidate beam identification, and specifically, CSI-RS is not configured for new candidate beam identification, the following are noted. FIG. 10 illustrates a graph 1000 of an example of four BRACH opportunities in the time domain, corresponding to four different SS indexes respectively as illustrated in a bottom row of graph 1000. Specifically, if a UE detects SS index 1 as the new identified beam, it should transmit a BRACH preamble on BRACH resource index 1, and so on and so forth. It is noted that a BRACH resource can be either FDMed (using different frequencies, for example) or CDMed (using different cyclic shifts, for example) with existing BRACH resources.

At the receiving side of a BRACH transmission, an access node monitors all BRACH resources for potential BFRQs. In detecting a valid UE-specific preamble, the access node is able to identify the UE identity. On the other hand, in detecting where the UE-specific preamble is received, the access node is able to identify the desired SS index from this particular UE. For example, if a UE-specific preamble is received during BRACH 1, the access node should interpret SS index 1 as the desired SS index from this particular UE.

As such, a two-step RACH procedure can be used. In the first step, a UE identifies a proper SS index, and selects a proper BRACH resource index accordingly in transmitting the UE-specific preamble. At the other side, an access node detects the BRACH preamble and infers the UE identity, and then detects the desired SS index by analyzing the location where the UE-specific preamble is received. In the second step, the access node sends out a BFRP to the UE. UE monitors a search space and can receive the BFRP successfully in general.

It is noted that such a two-step RACH procedure allows UE reporting of the beam failure event as well as new beam identification per SS. In some cases, e.g., if a beam quality such as RSRP or RSRQ is desired or if a beam refinement or management operation is desired, the access node can include an uplink transmission grant in the BFRP together with a beam quality report request, or kickoff a beam refinement procedure. Upon receiving the BFRP and the included uplink grant, the UE may send the requested beam quality as allowed by the uplink grant. If no further beam quality report or beam refinement is signaled in the BFRP, the UE may declare a successful beam failure recovery and refrain from further request for this beam failure event.

It is proposed that for beam failure recovery with SS-block-only as the new beam identification reference signal, a two-step RACH procedure is used to enable the UE to signal the UE identity and desired SS index, while the access node can include in the beam failure recovery response an indication (or information) to initiate a further beam quality report or kickoff a beam refinement.

In 3GPP RAM meeting #90, the following has been agreed to as a working assumption:

For beam failure recovery request transmission on BRACH, support using the resource that is CDM with other BRACH resources.

It is noted that CDM means the same sequence design with BRACH preambles.

It is noted that the preambles for BRACH for beam failure recover request transmission are chosen from those for content-free BRACH operation in 3GPP LTE Rel-15.

It is noted this feature is not intended to have any impact on design related to other BRACH resources.

For future study, consider whether TDM with other BRACH is needed.

In the scenario where beam failure recovery request transmission is CDMed with other BRACH resources, there may be a need to consider the transmit power of BFRQ. Because the BFRQ transmission shares the same physical resource with BRACH, a natural way is to reuse the power control mechanism of regular random access transmission (e.g., based on power ramping-up). However, because beam failure recovery is an exception handling procedure and needs to be done as quickly as possible, multiple retransmissions with small power ramping-up step sizes may result in unnecessary radio link failure in certain cases. For this reason, even though the same power control mechanism is adopted, it is necessary to use different parameter values for BFRQ transmission.

It is proposed that the same power control mechanism for beam failure recovery request as for regular random access transmission is used, but with different power control parameters.

Similar power control mechanisms may be used when SS-block-only or CSI-RS-only are used for new beam identification reference signal.

Figure 11:
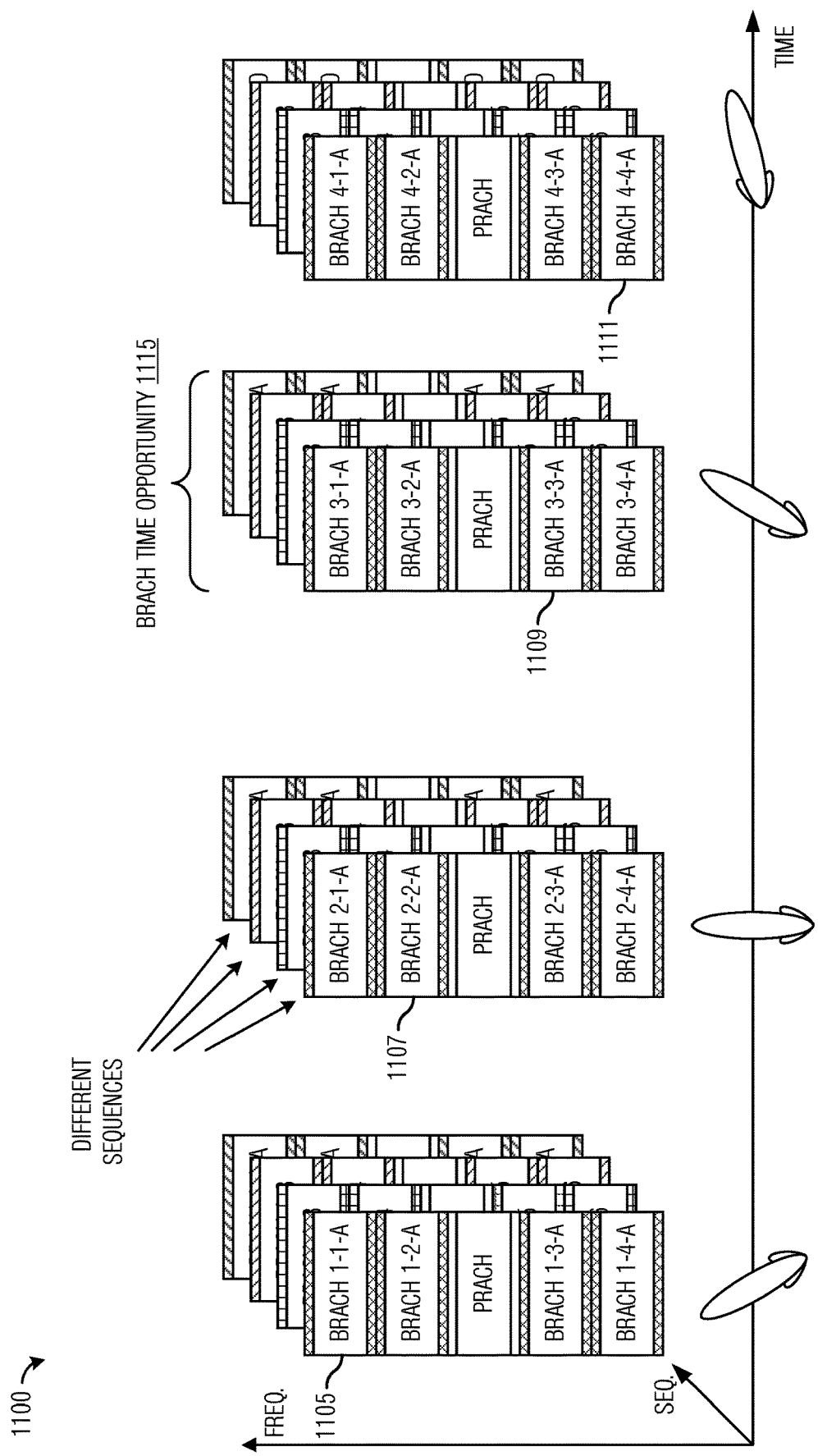
FIG. 11 illustrates a graph of an example of multiple BRACH opportunities, consisting of 64 BRACH resources across four BRACH time opportunities according to example embodiments described herein.

In a situation where CSI-RS only is configured for new candidate beam identification, and specifically, SS is not configured for new candidate beam identification, the following are noted. FIG. 11 illustrates a graph 1100 of an example of multiple BRACH opportunities, consisting of 64 BRACH resources (such as BRACH resources 1105, 1107, 1109, and 1111) across four BRACH time opportunities, such as BRACH time opportunity 1115. Herein each BRACH time opportunity is the smallest opportunity in the time domain for a UE to send beam failure recovery request preamble, where each BRACH resource is a smallest unit in the time, frequency and sequence domain that can be used by a UE to send a preamble sequence to trigger beam failure recovery. One BRACH resource may differentiate from another BRACH resource in the choice of either BRACH time opportunity, frequency index, cyclic shift or a combination of them. In the above example, a first 16 BRACH resources spanning four different frequency indexes and four different cyclic shifts fall into the first BRACH time opportunity, which holds a beam correspondence relationship with SS index 1; a second 16 BRACH resources spanning four different frequency indexes and four different cyclic shifts fall into the BRACH time opportunity as BRACH index 2, which holds a beam correspondence relationship with SS index 2; and so on and so forth. UE measures multiple CSI-RSs, identifies a proper CRI for new candidate beam, and is ready to trigger beam failure recovery and reports a new beam index for beam failure recovery.

For beam failure recovery purpose, the following two-step RACH procedure and four-step RACH procedure from several different aspects are compared. As beam failure recovery is an exception handling procedure where fast response is critical, beam failure recovery time may be the most important aspect. In general, two-step RACH procedure requires shorter time compared to four-step RACH procedure, mainly because it has less number of message exchanges involved.

In terms of message robustness, the two-step RACH procedure generally enjoys lower error probability for several reasons. Firstly, as two-step RACH procedure has less number of message exchanges, the probability of detection or demodulation error occurrence is lower. Secondly, as BRACH reuses BRACH preamble whose sequence design is targeted for initial access, its receive performance is more robust than that of regular PUCCH or PUSCHs. Therefore, the chance of error occurring on message 3 transmission is higher than that on BRACH preamble transmission.

In terms of resource overhead, the two-step RACH procedure and the four-step RACH procedure have their own pros and cons. If the number of UEs in a cell is small and the number of BRACH resources needed may be supported in one BRACH region, the two-step RACH procedure gives the minimum overhead. However, as the number of UEs increases and the number of BRACH resources needed cannot be supported within one BRACH region, and thus, more than one BRACH region needs to be assigned, its overhead can be increased. However, for the four-step RACH procedure, because a message 3 or 4 exchange is needed, it requires additional resources as a baseline.

In terms of information delivery, the two-step RACH procedure can only deliver UE index and new beam index. Furthermore, to acquire additional information such as beam quality information (e.g., RSRP or RSRQ), an access node needs to initiate separate beam management or refinement procedure as a follow-up. However, because the four-step RACH procedure can have an additional message 3 or 4 exchange, it can deliver not only UE index and new beam index, but also additional information such as beam quality information (e.g., RSRP or RSRQ). But, a complete sweeping of TX beam or RX beam may not be available for beam failure recovery procedure, hence additional beam management or refinement procedure may also be needed after finishing the beam failure recovery procedure even for four-step RACH procedure.

Furthermore, it is may be preferable to have a unified design between SS-block-only scenario and CSI-RS-only scenario. As is discussed in the previous subsection, the two-step RACH procedure is sufficient for SS-block-only scenario. Thus, if a similar two-step RACH procedure is used for CSI-RS-only scenario, it will make the overall beam failure recovery procedure more harmonized and cleaner.

Therefore, it is proposed that for beam failure recovery with CSI-RS-only as the new beam identification reference signal, support to use a two-step RACH procedure to expedite the overall beam failure recovery is provided.

It is noted that similar to the discussion earlier for SS-block-only scenario, such a two-step RACH procedure may not supply the access node with beam quality info such as RSRP or RSRQ. In case this is desired or if a beam refinement or management follow-up is desired, the access node may include an uplink transmission grant in the BFRP together with a beam quality report request, or kickoff a beam refinement procedure. Upon receiving the BFRP and the included uplink grant, the UE may send the requested beam quality as allowed by the uplink grant. If no further beam quality report or beam refinement is signaled in the BFRP, the UE may declare a successful beam failure recovery and refrain from further request for this beam failure event.

Several questions may exist. A first question is what the UE should report upon detecting the CRI. Naturally, the new beam index may be a CRI as detected by the UE. On the other hand, if there is a quasi-co-located (QCLed) relationship in effect between SSs and CSI-RSs (e.g., one or more CSI-RS beams belong to a SS beam), the new beam index may be an SS index, which is QCLed with the detected CRI. A QCLed relationship is a relationship between two reference signals or data signals such that the two signals may be viewed as possessing similar characteristics. Example characteristics include carrier frequency, time offset, frequency offset, spatial precoding vectors, and so on. This is also fine because SS index can be used to rebuild downlink control channels, and has been done in the SS-block-only scenario.

A second question is how many BRACH resources, per BRACH time opportunity, may be assigned by the access node to a UE to transmit the beam failure recovery preamble. In some cases, one BRACH resource can be assigned to each UE for every BRACH time opportunity. This may be useful when the overall number of BRACH resources available is small and the overall number of users is large. Furthermore, it is possible that more than one BRACH resources can be assigned to each UE for every BRACH time opportunity. This may be useful when the overall number of BRACH resources available is large and the overall number of users is small.

Considering these questions, the following alternative solutions for beam failure recovery are possible:

Alternative 1: the UE reports CRI; the access node assigns to each UE one preamble per BRACH time opportunity;

Alternative 2: the UE reports SS index; the access node assigns to each UE one preamble per BRACH time opportunity; and Alternative 3: the UE reports CRI; the access node assigns to each UE multiple preambles per BRACH time opportunity.

For Alternative 1, when a UE experiences a beam failure and identifies a new CRI (by monitoring available CSI-RS signals, for example), the UE can find correct BRACH time opportunity corresponding to the identified CRI (by using an association table between CRIs and BRACH time opportunities, while this association may be obtained from an SS-CRI association and a SS-BRACH-time-opportunity association, for example), and send its designated BRACH preamble. However, as the access node can only identify UE ID and SS index based on received BRACH preamble at specific BRACH time opportunity, an additional message 3 and message 4 exchange is needed to find out specific new beam index after the access node sends back response to the BRACH preamble (four-step RACH procedure). More details are presented in co-assigned U.S. Provisional Patent Application No. 62/521,110, entitled "System and Method for Communications Beam Recovery," filed Jun. 16, 2017, and U.S. Provisional Patent Application No. 62/544,420, entitled "System and Method for Communications Beam Recovery," filed Aug. 11, 2017, which are hereby incorporated herein by reference in their entireties.

For Alternative 2, when a UE experiences a beam failure and identifies a new CRI (by monitoring available CSI-RS signals, for example), the UE identifies a SS block that is QCL'ed with the identified CRI (by using an association table between CRIs and SSs, for example). Then, the UE sends its designated BRACH preamble at a BRACH time opportunity corresponding to the identified SS block (by using an association, possibly one-to-one, between SS and BRACH time opportunity, for example). In this case, when the access node needs only the SS index as the new beam index, and does not need CRIs as the new beam index, and sends back a response to the BRACH preamble, it finalizes the beam failure recovery procedure (a two-step RACH procedure). This can be viewed as a special case of alternative 1, with messages 3 and 4 skipped. It is noted that, similar to the SS-block-only scenario, the above two step procedure can be optionally extended to a four-step procedure, based on access node preference and signaling in the response. In an embodiment, the response includes a PDCCH or a PDSCH message from the access node to the UE. Upon detecting the PDCCH or PDSCH message, UE is able to receive a response and may conclude that the beam failure recovery procedure has completed successfully or unsuccessfully. In another embodiment, the response includes a request from the access node for further signaling. One example of such a request is that the access node may request, within this response message, the UE to further report beam quality information associated with the previous new identified beam index. Another example of such a request is that the access node may request, within this response message, the UE to participate in a downlink or uplink beam management, beam refinement, or beam tracking procedure, while the request itself may include configurations of such a beam management, beam refinement, or beam tracking procedure. Together with this request, the access node may also send a uplink grant to the UE assigning a certain uplink resources to the UE so that UE may use uplink resources to send the requested beam quality report, or to participate in the beam management, beam refinement, or beam tracking procedure (e.g., sending uplink sounding reference signals, sending downlink reference signal measurement results, and so on).

For both Alternative 1 and Alternative 2, one BRACH preamble is assigned to a UE, which implies that a BRACH preamble represents a UE ID. But, for Alternative 3, because multiple BRACH preambles are assigned to a UE, the BRACH preamble can directly represent both UE ID and new CRI of the UE. When a UE experiences a beam failure and identifies a new CRI, the UE sends a BRACH preamble corresponding to the identified CRI on BRACH time opportunity corresponding to the identified CRI. Because the BRACH preamble directly represents the identified CRI, the beam failure recovery procedure is finished when the access node sends back a response to the BRACH preamble (a two-step RACH procedure).

For all three alternatives mentioned above, to have the UE decide when or where to transmit corresponding BRACH preamble, the access node may need to configure an association between each CRI and BRACH resource. Two different options can be considered for this purpose. In the first option, the access node directly configures association between each CRI and BRACH resource. In this way, a UE can figure out which BRACH resource to use for each identified CRI (direct association). In the second option, the access node configures QCL relation between CSI-RS and SS block (e.g., one or more CSI-RS beams belong to a SS beam), and assigns different BRACH resource for each CSI-RS within a SS block (indirect association).

It is proposed that for beam failure recovery with CSI-RS only as the new beam identification reference signal, the access node be allowed to assign more than one BRACH resources per BRACH time opportunity to expedite the overall beam failure recovery. It is proposed that for beam failure recovery with CSI-RS only as the new beam identification reference signal, the UE supports reporting the SS index only (which is spatial QCLed with the detected CRI) to expedite the overall beam failure recovery. Note that the access node would need to send a signaling message to UEs conveying information about the time, frequency, or sequence configurations of BRACH resources, which are used by the UEs to transmit random access preambles to convey information about beam failure recovery to the access node.

FIG. 12 illustrates a flow diagram of example operations 1200 occurring in a UE participating in a random access procedure. Operations 1200 may be indicative of operations occurring in a UE as the UE participates in a random access procedure.

Operations 1200 begin with the UE sending a preamble (block 1205). The UE receives a response responsive to the preamble (block 1207). The response may include a further signaling indicator. The further signaling indicator may be data or information, for example. The further signaling indicator may convey information to the UE to report beam quality information associated with a beam index corresponding to the preamble. The further signaling indicator may convey information to the UE to participate in at least one of a downlink beam management procedure, an uplink beam management procedure, a beam refinement procedure, or a beam tracking procedure. The response may include an uplink resource grant. The UE may send the further signaling in accordance with the uplink resource grant. The UE sends the further signaling (block 1209).

FIG. 13 illustrates a flow diagram of example operations 1300 occurring in an access node participating in a random access procedure. Operations 1300 may be indicative of operations occurring at an access node as the access node participates in a random access procedure.

Operations 1300 begin with the access node receiving a preamble (block 1305). The access node sends a response responsive to the preamble (block 1307). The response may include a further signaling indicator. The further signaling indicator may be data or information, for example. The further signaling indicator may convey information to the UE to report beam quality information associated with a beam index corresponding to the preamble. The further signaling indicator may convey information to the UE to participate in at least one of a downlink beam management procedure, an uplink beam management procedure, a beam refinement procedure, or a beam tracking procedure. The response may include an uplink resource grant. The access node may receive the further signaling in accordance with the uplink resource grant. The access node receives the further signaling (block 1309).

It is noted that beaming or beamforming is indispensable in 5G mmWave communications systems.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, a determining unit or module, or a selecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method, comprising:
receiving, by a user equipment (UE) from a source access node, a first configuration indicating a first random access resource and a random access preamble for transmitting a handover request, the first random access resource being from a first subset of one or more random access resources, the first subset of one or more random access resources associated with the UE, the UE being served by a communications beam, the first random access resource and the random access preamble allocated by a target access node;
receiving, by the UE from the source access node, a second configuration indicating a second random access resource for transmitting a beam failure recovery request (BFRQ), the second random access resource being from a second subset of one or more random access resources, the second subset of one or more random access resources being unassociated with the communications beam serving the UE;
transmitting, by the UE to the source access node, the handover request including the random access preamble in the first random access resource; and
transmitting, by the UE to the source access node, the BFRQ including the random access preamble in the second random access resource.

2. The method of claim 1, wherein the first subset of one or more random access resources and the second subset of one or more random access resources are mutually exclusive.

3. The method of claim 1, wherein the random access preamble is UE-specific.

4. The method of claim 1, the BFRQ and the handover request being multiplexed such that the random access preamble is used to convey information about the BFRQ and the handover request.

5. A method, comprising:
transmitting, by a source access node to a user equipment (UE), a first configuration indicating a first random access resource and a random access preamble for transmitting a handover request, the first random access resource being from a first subset of one or more random access resources, the first subset of one or more random access resources associated with the UE, the UE being served by a communications beam, the first random access resource and the random access preamble allocated by a target access node;
transmitting, by the source access node to the UE, a second configuration indicating a second random access resource for transmitting a beam failure recovery request (BFRQ), the second random access resource being from a second subset of one or more random access resources;
receiving, by the source access node from the UE, the handover request including the random access preamble in the first random access resource;
receiving, by the source access node from the UE, the BFRQ including the random access preamble in the second random access resource;
determining, by the source access node, that the second random access resource is unassociated with the communications beam serving the UE; and
determining, by the source access node, that the BFRQ is requesting beam failure recovery.

6. The method of claim 5, further comprising:
sending, by the source access node to the UE, a response responsive to the handover request.

7. A user equipment (UE) comprising:
at least one processor; and
a non-transitory computer readable storage medium storing programming for execution by the at least one processor, the programming including instructions that cause the UE to:
receive, from a source access node, a first configuration indicating a first random access resource and a random access preamble for transmitting a handover request from, the first random access resource being a first subset of one or more random access resources, the first subset of one or more random access resources associated with the UE, the UE being served by a communications beam, the first random access resource and the random access preamble allocated by a target access node;
receive, from the source access node, a second configuration indicating a second random access resource for transmitting a beam failure recovery request (BFRQ), the second random access resource being from a second subset of one or more random access resources, the second subset of one or more random access resources being unassociated with the communications beam serving the UE;

transmit, to the source access node, the handover request including the random access preamble in the first random access resource; and transmit, to the source access node, the BFRQ including the random access preamble in the second random access resource.

8. The UE of claim 7, wherein the first subset of one or more random access resources and the second subset of one or more random access resources are mutually exclusive.

9. A source access node comprising:

at least one processor; and a non-transitory computer readable storage medium storing programming for execution by the at least one processor, the programming including instructions that cause the source access node to:

transmit, to a user equipment (UE), a first configuration indicating a first random access resource and a random access preamble for transmitting a handover request, the first random access resource being from a first subset of one or more random access resources, the first subset of one or more random access resources associated with the UE, the UE being served by a communications beam, the first random access resource and the random access preamble allocated by a target access node;

transmit, to the UE, a second configuration indicating a second random access resource for transmitting a beam failure recovery request (BFRQ), the second random access resource being from a second subset of one or more random access resources;

receive, from the UE, the BFRQ including the random access preamble in the second random access resource;

receive, from the UE, the handover request including the random access preamble in the first random access resource;

determine that the second random access resource is unassociated with the communications beam serving the UE; and determine that the BFRQ is requesting beam failure recovery.

10. The source access node of claim 9, wherein the programming further includes instructions that cause the source access node to:

send, to the UE, a response responsive to the handover request.

* * * * *